(12) United States Patent
Lundstrom et al.

(10) Patent No.: US 11,247,360 B2
(45) Date of Patent: Feb. 15, 2022

(54) BLADE PORTION FOR A METAL CUTTING GROOVING TOOL

(71) Applicant: SANDVIK INTELLECTUAL PROPERTY AB, Sandviken (SE)

(72) Inventors: Staffan Lundstrom, Gavle (SE); Johan Anderstedt, Sandviken (SE)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 0 days.

(21) Appl. No.: 16/483,390

(22) PCT Filed: Aug. 17, 2017

(86) PCT No.: PCT/EP2017/070865
§ 371 (c)(1),
(2) Date: Aug. 2, 2019

(87) PCT Pub. No.: WO2018/077508
PCT Pub. Date: May 3, 2018

(65) Prior Publication Data
US 2020/0009757 A1 Jan. 9, 2020

(30) Foreign Application Priority Data
Feb. 3, 2017 (EP) .................................... 17154542

(51) Int. Cl.
*B26D 3/06* (2006.01)
*B23B 29/02* (2006.01)

(52) U.S. Cl.
CPC .............. *B26D 3/065* (2013.01); *B23B 29/02* (2013.01)

(58) Field of Classification Search
CPC ............. Y10T 407/22; Y10T 407/2202; Y10T 407/2266; Y10T 407/2268; Y10T 83/0304;
(Continued)

(56) References Cited

U.S. PATENT DOCUMENTS 2,836,240 A 5/1958 Anton
3,230,802 A 1/1966 Johnson
(Continued)

FOREIGN PATENT DOCUMENTS

CN 203843202 U 9/2014
EP 3095541 B1 6/2019
(Continued)

*Primary Examiner* — Phong H Nguyen
(74) *Attorney, Agent, or Firm* — Corinne R. Gorski (57) ABSTRACT

A blade portion for a grooving tool includes opposite first and second surfaces, a blade width thereof being defined as a shortest distance between the first and second surfaces, opposite third and fourth surfaces, and a fifth surface and an opposite blade portion end. The blade width is constant or substantially constant from the fifth surface up to the blade portion end. An insert seat separating the third surface and the fifth surface is arranged to receive an insert having a main cutting edge, an associated rake face, and an associated main clearance surface. The main cutting edge defines an insert width being greater than the blade width. A shortest distance from the fifth surface to the opposite blade portion end is greater than a shortest distance from the third surface to the fourth surface.

17 Claims, 4 Drawing Sheets

(58) Field of Classification Search
CPC ............. Y10T 83/9319; Y10T 83/9353; Y10T 83/9355; B26D 3/065; B26D 3/06; B23D 27/04; B23D 27/045; B23D 27/06; B23D 27/14; B23D 27/141; B23D 27/143; B23D 27/145; B23D 27/16; B23D 27/1603; B23D 27/1607; B23D 27/1611; B23D 29/04; B23D 29/02; B23D 29/03; B23D 29/043; B23D 29/046; B23D 29/06; B23D 2205/02; B23D 2205/00
See application file for complete search history.

(56) References Cited

U.S. PATENT DOCUMENTS

| | | |
|---|---|---|
| 3,551,977 A | 1/1971 | Novkov |
| 4,167,129 A | 9/1979 | Leunissen |
| 4,213,356 A | 7/1980 | Armitage |
| 5,135,336 A | 8/1992 | Noguchi et al. |
| 5,150,992 A * | 9/1992 | Friedmann ............ B23B 27/045 407/110 |
| 5,375,948 A | 12/1994 | Lindstedt |
| 7,416,372 B2 * | 8/2008 | Hyatt ..................... B23B 1/00 29/889 |
| 9,475,122 B2 * | 10/2016 | Andersson ............. B23B 27/10 |
| 2002/0170396 A1 | 11/2002 | Maier |
| 2013/0129428 A1 * | 5/2013 | Henry ..................... B23B 27/10 407/11 |
| 2015/0003921 A1 | 1/2015 | Andersson et al. |
| 2015/0063929 A1 | 3/2015 | Hecht et al. |

FOREIGN PATENT DOCUMENTS

| | | |
|---|---|---|
| JP | S4112709 U | 6/1941 |
| JP | S5380080 A | 7/1978 |
| JP | H6297210 A | 10/1994 |
| JP | 200218605 A | 1/2002 |

* cited by examiner

BLADE PORTION FOR A METAL CUTTING GROOVING TOOL

RELATED APPLICATION DATA

This application is a § 371 National Stage Application of PCT International Application No. PCT/EP2017/070865 filed Aug. 17, 2017 with priority to EP 17154542.9 filed Feb. 3, 2017.

TECHNICAL FIELD OF THE INVENTION

The present invention belongs to the technical field of cutting tools. More specifically the present invention belongs to the field of blade portions of grooving tools used in metal cutting machining. Such machining can be made using computer or computerized numerical control, i.e. CNC, machines.

BACKGROUND OF THE INVENTION AND PRIOR ART

The present invention refers to a blade portion according to the preamble of claim 1. In other words, the present invention refers to a blade portion for a grooving tool, the blade portion comprising opposite first and second surfaces, wherein a blade width is defined as a shortest distance between the first and second surfaces, opposite third and fourth surfaces, a fifth surface and an opposite blade portion end, wherein the blade width is constant or substantially constant from the fifth surface up to the blade portion end, an insert seat separating the third surface and the fifth surface, wherein the insert seat can receive an insert comprising a main cutting edge, an associated rake face, and an associated main clearance surface, wherein the main cutting edge defines an insert width being greater than the blade width.

Figure 1:
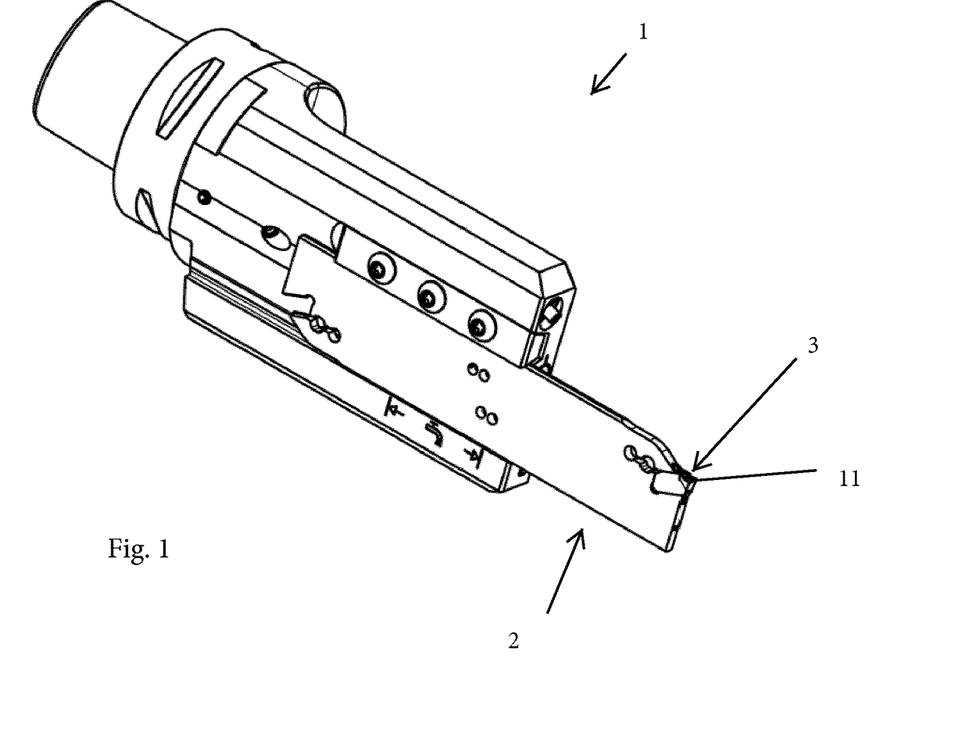
FIG. 1 is a perspective view of a state of the art grooving tool including a blade portion and an insert.
Figure 2:
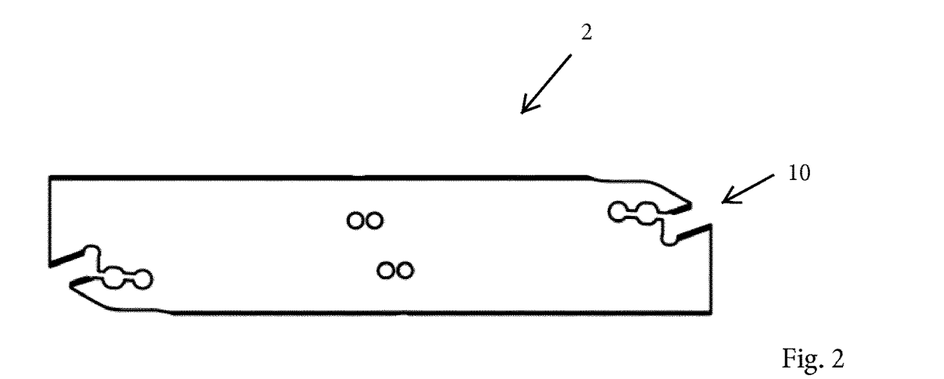
FIG. 2 is a side view of the blade portion in FIG. 1.
Figure 3:
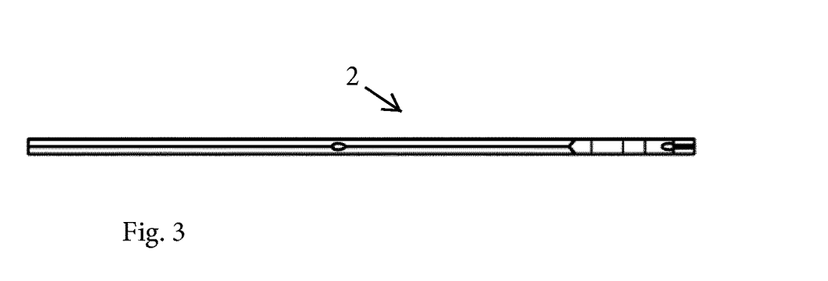
FIG. 3 is a top view of the blade portion in FIG. 2.
Figure 4:
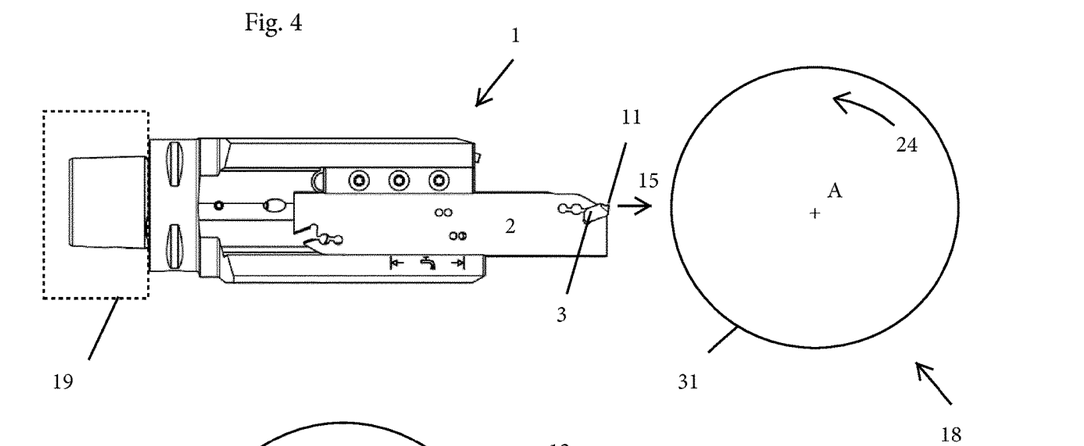
FIG. 4 is a side view of a state of the art machining method using the grooving tool in FIG. 1.

Metal cutting parting-off, cutting-off or deep grooving, have long been known to be a difficult operation. Chip jamming have been known to be one problem. One other problem have been vibration, causing risk of tool breakage and poor surface finish, among other things. Such an operation and cutting tool is described in e.g. U.S. Pat. No. 5,135,336, FIG. 4. There is thus a long-felt need to reduce vibrations in parting-off or deep grooving operations.

SUMMARY OF THE INVENTION

The inventors have found that there is a need for a further improved cutting tool in order to reduce the risk of vibrations. The inventors have found that for state of the art blade portions, the vibrations may be caused be deflection of the cutting tool during cutting. An object of the present invention is to provide a blade portion which reduced vibrations.

This object is achieved with the initially defined blade portion which is characterized in that the insert is mountable in the insert seat such that the main clearance surface and the third surface are facing in the same direction or in substantially the same direction and where a shortest distance from the fifth surface to the opposite blade portion end is greater than a shortest distance from the third surface to the fourth surface.

By such a blade portion, the risk of vibrations during deep grooving or parting-off can be reduced. Further effects may be possibility to increase the feed rate, choosing a smaller insert width, improved surface finish, and reduced insert wear. By such a blade portion, which is more elongated in a direction which is parallel to a tangential force than in a direction parallel to a radial force, the deflection of the insert during cutting may be reduced, especially if the grooving tool is mounted or clamped such that the tangential cutting force is directed towards the machine interface to which the grooving tool is mounted or clamped. Such a grooving tool is preferably used in a machine tool or computer (or computerized) numeric control (CNC) machine having y-axis capability, such as a multi-task machine or a mill-turn machine. By such a blade portion, reduced vibration risk can be achieved without increasing the weight or size of the blade portion. Such a grooving tool is preferably used in relatively deep external grooving or parting-off, especially where the depth of cut is greater than the length of the insert, where the length of the insert is defined as a shortest distance between the front surface and the rear surface of the insert.

A blade portion may be a singular body, entity or device. Alternatively, the blade portion may a part or a portion of a singular body, entity or device. The blade portion is suitable for grooving which also includes parting or parting-off. More precisely, the blade portion is suitable for external turning, where a metallic work piece is rotating around a rotational axis thereof, and where the blade portion during cutting is moved towards the rotational axis.

The blade portion comprises, or is limited by, opposite first and second surfaces, or first and second side surfaces. A blade width is defined as a shortest distance between the first and second surfaces. In deep grooving or parting-off, the first and second side surfaces are facing respective first and second side, or wall, surfaces of the groove. The first and second side surfaces are preferably flat or planar.

The blade portion further comprises, or is further limited by, opposite third and fourth surfaces. The third surface is during grooving facing the feed direction, and thus the bottom surface of the groove. The third and fourth surfaces may be flat or planar. Preferably, especially if the blade portion is in the form of a singular body, entity or device, the third and fourth surfaces are V-shaped or opposite V-shaped in a cross section.

The blade portion further comprises, or is further limited by a fifth, or top, surface and an opposite blade portion end.

The blade portion end may be in the form of blade portion end surface, especially if the blade portion is in the form of a singular body, entity or device. Alternatively, the blade portion end may be defined as a border line or limiting line between a blade portion, which is dimensioned to be inside the groove, and further, rear or connecting portion of a cutting tool or grooving tool or grooving device which is not dimensioned to be inside the groove. In this case, the blade portion end is a border defined by a change of blade width.

The blade portion end may in a side view be in the form of a straight line. Alternatively, the blade portion end may in a side view be in a form of a curved line, where said curved line may be a circular arc, where the center of said circle in a side view intersect or substantially intersect the main cutting edge of the insert.

The blade width is constant or substantially constant from the fifth surface up to the blade portion end. The blade width is preferable within the range of 1.0-20.0 mm, even more preferably 1.5-12.0 mm.

The blade portion may comprise one or more coolant or fluid channels. Said coolant or fluid channel or channels preferably extend such that the center of said channels extends in a first mid-plane located equidistantly between the opposite first and second surfaces.

Said coolant channel preferably comprise an inlet intersecting at least one of the first and second surfaces, and an outlet in the third surface. Said coolant channel is preferably arranged to direct a coolant or fluid stream towards a cutting zone, or to a main cutting edge of an insert mounted in the insert seat.

An insert seat, or an insert receiving recess, opens such that the third surface and the fifth surface are separated. The insert seat connects the third surface and the fifth surface.

The insert seat can receive, or is suitable for, an insert or a parting insert or a grooving insert comprising a main cutting edge, an associated rake face, and an associated main clearance surface. The rake face is a portion of a top surface of the insert. The top surface of the insert preferably comprises chip forming or chip breaking means, preferably in the form of one or more protrusions and/or one or more depressions. The main clearance surface is facing substantially the direction, or within +/−20 degrees, of the feed direction.

The main cutting edge defines an insert width. In grooving, the groove width is equal to the insert width, i.e. the width of the main cutting edge. The main cutting edge is the widest portion of the insert, in other words, a straight line connecting the opposite end points of the main cutting edge is equally long or preferably longer than all parallel lines having end-points thereof intersecting the insert.

The insert width is greater than the blade width. Preferably the insert width is 1-25% wider, even more preferably 5-15% wider, than the blade width. The insert width and the blade width are measured along parallel lines.

The insert is mountable in the insert seat such that the main clearance surface and the third surface are facing in the same direction or substantially, i.e. within +/−20 degrees, of the same direction.

A shortest distance from the fifth surface to the opposite blade portion end, or blade portion end surface, is greater than a shortest distance from the third surface to the fourth surface.

According to an embodiment of the invention, the blade portion end is a blade portion end surface, wherein the blade portion is a singular body limited by the opposite first and second surfaces, the opposite third and fourth surfaces, and the opposite fifth and blade portion end surfaces.

By such a blade portion, replacement of the blade portion can be made in an economical way when the insert seat is worn.

The blade portion end is a blade portion end surface and the blade portion is a singular body, preferably having a constant blade width. Such singular body may preferably in the form of a cutting blade or a parting blade. Such singular body is preferably made from, or alternatively comprises, a single piece of metal such as preferably steel. Such singular body may be clamped in a tool block.

The opposite first and second surfaces, or side surfaces, are preferably parallel and flat. The opposite third and fourth surfaces, or top and bottom surfaces, are preferably V-shaped in a cross section or are shaped in another suitable way. The opposite third and fourth surfaces are clamping surfaces, more precisely the third and fourth surfaces are suitable to be in contact with a tool block or another blade portion clamping device. The opposite third and fourth surfaces are preferably parallel.

The blade portion may comprise only one insert seat. Alternatively, the blade portion may comprise a second insert seat, in that the second insert seat separates the blade portion end surface and the fourth surface, in that the insert seat and the second insert seat are diagonally opposite relative to each other.

According to an embodiment of the invention, the distance from the fifth surface to the opposite blade portion end is 3-8 times greater than a distance from the third surface to the fourth surface and the distance from the third surface to the fourth surface is 5-20 times greater than the blade width.

By such a blade portion, which preferably is in the form of a singular body, reduced vibration may be achieve without adding unnecessary weight or material to the blade portion.

A shortest distance from the fifth surface to the opposite blade portion end, which preferably is within the range of 100-400 mm, is 3-8 times greater than a distance from the third surface to the fourth surface. The fifth surface is preferably not straight in a side view.

According to an embodiment of the invention, the opposite first and second surfaces are parallel or substantially parallel.

The opposite first and second surfaces are parallel or substantially parallel, and preferably flat, i.e. extending in parallel planes.

According to an embodiment of the invention, the opposite third and fourth surfaces are parallel or substantially parallel.

By such a blade portion, the blade portion may be clampable to a tool block such that a distance between the coupling portion and the blade portion can be chosen over a continuous range, especially if the blade portion is in the form of a singular body.

The opposite third and fourth surfaces are parallel or substantially parallel in a side view. More precisely, the opposite third and fourth surfaces extend mainly in directions which are parallel. Each of the opposite third and fourth surfaces preferably comprises two or more inclined sub-surfaces.

According to an embodiment of the invention, the insert seat is arranged such that the inherent elasticity of the blade portion is utilized to clamp an insert in the insert seat.

By such a blade portion, clamping of the insert can be made in an economical and space reducing way, in relation to other insert clamping means such as a clamping screw.

Preferably, the blade portion comprises a slot, wherein the slot comprises the insert seat. Preferably, a second mid-plane of the blade portion, equidistantly or substantially equidistantly between the opposite third and fourth surfaces, intersect said slot. Preferably, an insert mounted in the insert seat is spaced apart from said second mid-plane.

According to an embodiment of the invention, the third surface comprises a sixth surface and a seventh surface; wherein the fourth surface comprises an eighth surface and a ninth surface; wherein at least one of the sixth, seventh, eighth or ninth surfaces in a cross section forms an angle greater than 90 degrees in relation to at least one of the opposite first and second surfaces.

By such a blade portion, clamping and/or stability is further improved when clamping the blade portion in a tool block.

Preferably, in a cross section in a plane perpendicular to the first and second surfaces and which plane intersect the third and fourth surfaces, the sixth surface forms an angle of 100-140 degrees relative to the first surface, the seventh surface forms an angle of 100-140 degrees relative to the second surface, the eighth surface forms an angle of 100-140 degrees relative to the first surface, and the ninth surface forms an angle of 100-140 degrees relative to the second surface.

According to an embodiment of the invention, the third surface comprises a sixth surface and a seventh surface;

wherein the fourth surface comprises an eighth surface and a ninth surface; wherein the sixth surface and the seventh surface in a cross section converge towards a first mid-plane located equidistantly between the opposite first and second surfaces; and wherein the eighth surface and the ninth surface in a cross section converge towards the first mid-plane.

By such a blade portion, clamping and/or stability is further improved when clamping the blade portion in a tool block.

According to an embodiment of the invention comprising an insert, the insert comprises a main cutting edge, an associated rake face and an associated main clearance surface; wherein the main cutting edge defines an insert width greater than the blade width; wherein the insert is mounted in the insert seat such that the main clearance surface and the third surface is facing in the same direction.

By such a blade portion and cutting insert, where the insert width is greater than the blade width, deep grooving or parting-off is possible. In other words, the insert can during cut be completely be inside a groove having a width equal to the insert width without being limited by the blade portion.

The main cutting edge defines an insert width. In grooving or parting-off, the groove width is equal to the insert width, i.e. the width of the main cutting edge. The main cutting edge is the widest portion of the insert, in other words, a straight line connecting the opposite end points of the main cutting edge is equally long or preferably longer than all parallel lines having end-points thereof intersecting the insert.

The insert width is greater than the blade width. Preferably the insert width is 1-25% wider, even more preferably 5-15% wider, than the blade width. The insert width and the blade width are measured along parallel lines.

The insert is mountable in the insert seat such that the main clearance surface and the third surface are facing in the same direction or substantially, i.e. within +/−20 degrees, of the same direction.

According to an embodiment of the invention comprising an insert, the insert comprises a main cutting edge, an associated rake face and an associated main clearance surface; wherein the main cutting edge defines an insert width greater than the blade width; the insert comprises a top surface and an opposite bottom surface, a front surface and an opposite rear surface, a first side surface and an opposite second side surface; wherein the top surface comprises the rake face; wherein the front surface comprises the main clearance surface; wherein the insert seat separates the third surface and the fifth surface; wherein the insert is mounted in the insert seat such that a portion of the bottom surface and a portion of the rear surface is in contact with the insert seat; wherein a second mid-plane of the blade portion is equidistantly or substantially equidistantly between the opposite third and fourth surfaces; and wherein a plane parallel to the second mid-plane intersect the top and bottom surfaces of the insert.

Preferably, the insert is mounted in the insert seat such that a portion of the top surface is in contact with the insert seat.

According to an embodiment of the invention comprising an insert, the insert comprises a main cutting edge, an associated rake face and an associated main clearance surface; wherein the main cutting edge defining an insert width greater than the blade width; wherein the insert is mounted in the insert seat such that the main cutting edge is arranged symmetrically in relation to a first mid-plane equidistantly or substantially equidistantly between the opposite first and second surfaces.

By such a blade portion and insert, side clearance during cutting is equally large, giving a balanced cutting tool.

According to an embodiment of the invention comprising an insert, the rake face comprises chip breaking or chip control means which chip breaking or chip control means are arranged such that the chip width in grooving can be reduced in relation to the insert width.

By such embodiment, the risk of chip jamming is reduced. The rake face is non-planar, since a flat or planar rake face do not alter the width of the chip cut.

According to an embodiment of the invention comprising an insert, the rake face comprises chip breaking or chip control means in the form of one or more protrusions and/or one or more depressions.

By such an arrangement, the risk of chip jamming is reduced. Many topographic arrangement of the rake face is possible, including a singular and preferably central protrusion. Preferably, a combination of protrusions, preferably two or more ridges, and depressions are arranged on the rake face.

According to an embodiment of the invention comprising an insert, a second mid-plane of the blade portion is equidistantly or substantially equidistantly between the opposite third and fourth surfaces, and wherein a distance from the second mid-plane to main cutting edge is greater than a distance from the second mid-plane to the third surface.

The difference in said distances is preferably 0.1-2-0 mm, even more preferably 0.1-1.0 mm.

Said difference in distance reduces the risk of damaging the blade portion, in cases where the tool set up or cutting conditions deviates from an ideal state.

According to an embodiment of the invention, a grooving tool comprises the blade portion, wherein the grooving tool comprises a coupling portion suitable to be connected to a machine interface; wherein the fifth surface is facing in a direction which is opposite in relation to the coupling portion.

By such a grooving tool, vibration risk can be further reduced.

Preferably, the coupling portion is positioned such that the rake face of the cutting insert mounted in the insert seat is facing a direction which is opposite the coupling portion.

The coupling portion is suitable to be connected to a machine tool which can be used for turning and grooving, such as a turning lathe, a multi task machine, a turn-mill machine, or a sliding head machine. The machine tool is preferably a CNC, i.e. computer or computerized numerical control, machine. The coupling portion is suitable to be connected to a machine interface, such as a machine spindle or a tool revolver turret or a tool post. The coupling portion may have a square or rectangular shape in a cross section. The coupling portion may be conical or substantially conical such as preferably according to ISO standard 26623-1.

According to an embodiment of the invention, a grooving tool comprises the blade portion, wherein the grooving tool comprises exactly one insert.

Thus, even if the blade portion comprises two diagonally opposite, in side view, insert seat, exactly one insert is mounted in the blade portion.

According to an embodiment of the invention, a grooving tool comprises the blade portion, wherein the grooving tool comprises a tool block; wherein the blade portion is clamped to the tool block; wherein at least a portion of the third surface and at least a portion of the fourth surface is in contact with the tool block; and wherein the tool block comprises a coupling portion suitable to be connected to a machine interface.

A tool block or a mounting block or a mounting device is suitable to clamp a blade portion, especially a blade portion which is in the form of a singular body.

According to an embodiment of the invention, a grooving tool comprises the blade portion, wherein the grooving tool comprises a tool block; wherein the tool block comprises a coupling portion suitable to be connected to a machine interface; and wherein the blade portion is clampable to the tool block such that a distance between the coupling portion and the blade portion can be chosen over a continuous range.

Thus, an overhang of the blade portion, which overhang defines the maximum grooving depth, may be chosen or selected or adjusted over a range, thereby reducing the vibration risk.

According to an aspect of the invention, a method for cutting a groove of a predetermined groove width in a work piece comprises the steps of: providing a work piece comprising metal, the work piece having a peripheral surface; providing the grooving tool, the grooving tool comprising an insert; selecting the insert width to be greater than the blade width; connecting the grooving tool to a machine interface of a machine tool; rotating the work piece about a rotational axis thereof in a rotational direction; cutting a groove in the work piece by moving the tool in a feed direction towards the rotational axis of the work piece such that the groove width is equal to the insert width and such that a tangential cutting force is directed towards or substantially towards the machine interface.

DESCRIPTION OF THE DRAWINGS

The present invention will now be explained in more detail by a description of different embodiments of the invention and by reference to the accompanying drawings.

FIG. 17 is a front view of the grooving tool portion in FIG. 16.

All figures except FIG. 9 have been drawn to scale.

DETAILED DESCRIPTION OF EMBODIMENTS OF THE INVENTION

Reference is made to FIGS. 1-4 which show a state of the art grooving tool 1, a state of the art blade portion 2, a state of the art insert 3 mounted in an insert seat 10 of the blade portion 2. During a cutting operation, such as a grooving or parting or cutting-off operation, the grooving tool 1 is connected to a machine interface 19 and moved in a feed direction 15 towards a rotational axis A of a metal work piece 18. The work piece 18 rotates around the rotational axis A thereof in a rotational direction 24. A main cutting edge 11 of the insert 3 cuts a groove in the peripheral surface 31 of the work piece 18. A tangential cutting force (not shown) is directed downwards in FIG. 4.

Reference is now made to FIG. 5-9, which show a blade portion 2 according to a first embodiment and a method according to an embodiment. The grooving tool 1 comprises a blade portion 2 having a constant or substantially constant blade width 13, and an insert 3 having a maximum insert width 14 defined by a main cutting edge 11. The insert width 14 is greater than the blade width 13. The grooving tool 1 comprises a tool block 30. The grooving tool 1 is connected to a machine interface 19 of a machine tool (not shown). More precisely, the tool block 30 comprises a coupling portion 32 connected to the machine interface 19. The blade portion 2 comprises opposite first and second surfaces 4, 5. The blade width 13 is defined as a shortest distance between the first and second surfaces 4, 5. The blade portion 2 comprises opposite third and fourth surfaces 8, 9. The blade portion comprises a fifth surface 6 and an opposite blade portion end 7. The blade width 13 is constant or substantially constant from the fifth surface 6 up to the blade portion end 7. A shortest distance 16 from the fifth surface 6 to the opposite blade portion end 7 is greater than a shortest distance 17 from the third surface 8 to the fourth surface 9. The blade portion end 7 is a blade portion end surface 7. The blade portion 2 is a singular body limited by the opposite first and second surfaces 4, 5, the opposite third and fourth surfaces 8, 9, and the opposite fifth and blade portion end surfaces 6, 7. The distance 16 from the fifth surface 6 to the opposite blade portion end 7 is 3-8 times greater than a distance 17 from the third surface 8 to the fourth surface 9. The distance 17 from the third surface 8 to the fourth surface 9 is 5-20 times greater than the blade width 13. The opposite first and second surfaces 4, 5 are parallel or substantially parallel. The insert seat 10 is arranged such that the inherent elasticity of the blade portion 2 is utilized to clamp an insert 3 in the insert seat 10.

Figure 6:
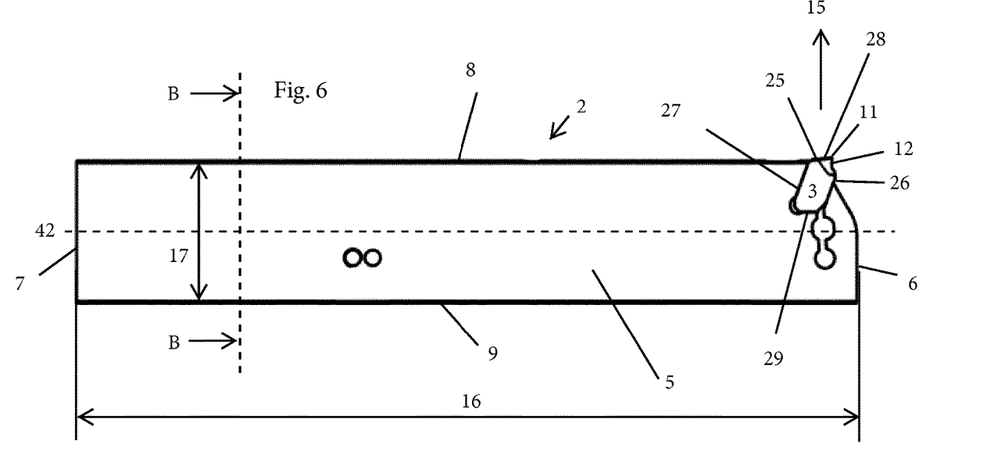
FIG. 6 is a side view of the blade portion in FIG. 5.
Figure 7:
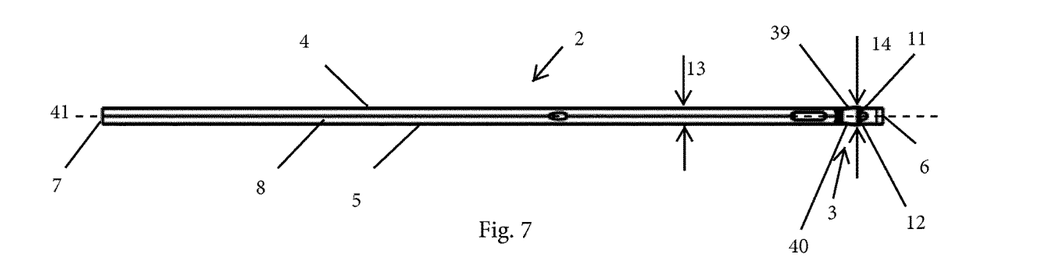
FIG. 7 is a front view of the blade portion in FIG. 6.
Figure 8:
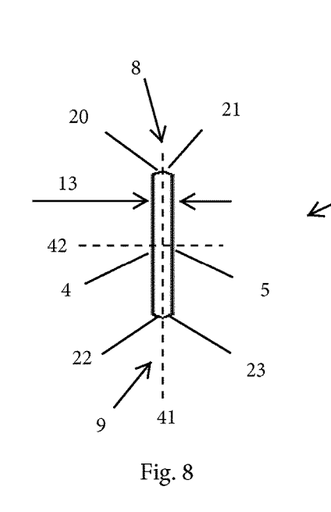
FIG. 8 is a view of section B-B in FIG. 6.

The opposite third and fourth surfaces 8, 9 are parallel or substantially parallel in a side view as seen in FIG. 6. As seen in e.g. FIG. 8, the third surface 8 comprises a sixth surface 20 and a seventh surface 21, and the fourth surface 9 comprises an eighth surface 22 and a ninth surface 23. The sixth surface 20 and the seventh surface 21 in a cross section converge towards a first mid-plane 41 located equidistantly between the opposite first and second surfaces 4, 5. The eighth surface 22 and the ninth surface 23 in a cross section converge towards the first mid-plane 41. A distance between the third and fourth surfaces 8, 9 is greatest in the first mid-plane 41.

The insert seat 10 separates the third surface 8 and the fifth surface 6. A second mid-plane 42 of the blade portion 2 is equidistantly or substantially equidistantly between the opposite third and fourth surfaces 8, 9.

The insert 3 comprises a main cutting edge 11, an associated rake face 12, and an associated main clearance surface 25. The main cutting edge 11 defines an insert width 14. The insert width 14 is greater than the blade width 13. The insert 3 comprising a top surface 26 and an opposite bottom surface 27, a front surface 28 and an opposite rear surface 29, a first side surface 39 and an opposite second side surface 40. The top surface 26 comprises the rake face. The front surface 28 comprises the main clearance surface 25;

The insert 3 is removably clamped, seated or mounted in the insert seat 10. When the insert 3 is mounted in the insert seat 10, the main clearance surface 25 and the third surface 8 are facing in the same direction 15, i.e. the feed direction 15. The main clearance surface 25 of the insert 3 and the third surface 8 of the blade portion are facing in the same direction 15 or in substantially the same direction 15. When the insert 3 is mounted in the insert seat 10, a portion of the bottom surface 27 and a portion of the rear surface 29 is in contact with the insert seat 10. A plane parallel to the second mid-plane 42 intersect the top and bottom surfaces 26, 27 of the insert 3. When the insert 3 is mounted in the insert seat 10, the main cutting edge 11 is arranged symmetrically in relation to a first mid-plane 41 equidistantly or substantially equidistantly between the opposite first and second surfaces 4, 5, and the fifth surface 6 is facing in a direction which is opposite in relation to the coupling portion 32.

Figure 5:
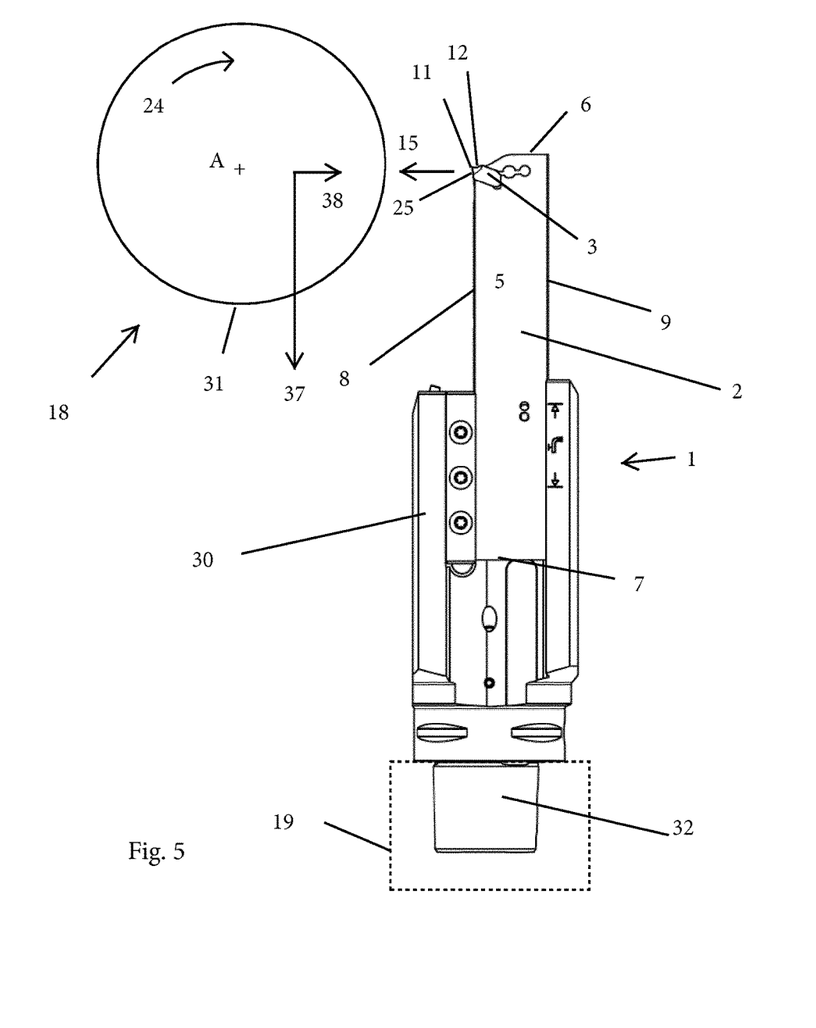
FIG. 5 is a side view of a machining method using a grooving tool comprising a blade portion according to a first embodiment.
Figure 9:
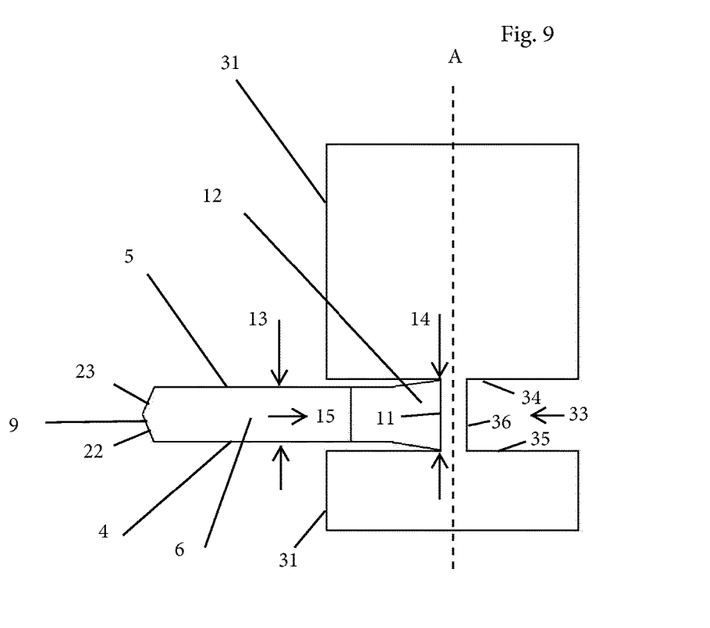
FIG. 9 is a top view of a machining method using a blade portion according to a first embodiment.

A portion of the third surface 8 and a portion of the fourth surface 9 of the blade portion 2 is in contact with the tool block 30. The blade portion 2 is clampable to the tool block 30 such that a distance between the coupling portion 32 and the blade portion 2 can be chosen over a continuous range. As seen in FIGS. 5 and 9, a metallic work piece 18 having a peripheral surface 31 rotates about a rotational axis A thereof in a rotational direction 24.

A groove 33 having a predetermined groove width equal to the insert width 14, or the width of the main cutting edge 11, is cut in the work piece 18 by moving the tool 1 in a feed direction 15 towards the rotational axis A of the work piece 18. The groove width is equal to or substantially equal to the insert width 14. A tangential cutting force 37 is directed towards or substantially towards the machine interface 19. A radial cutting force 38 is directed in an opposite direction relative to the feed direction 15.

In e.g. parting off or cutting off of a solid bar work piece 18, the feed of the grooving tool 1 continues such that the main cutting edge 11 intersects or substantially intersects the rotational axis A. FIG. 9 may show a situation prior to the actual parting off, where the main cutting edge 11 have not yet intersected the rotational axis A, and where a bottom surface 36 of the groove 33 connects first and second side surfaces 34, 35 of the groove 33. The first and second side surfaces 34, 35 of the groove 33 are perpendicular to the rotational axis A. A distance between the first and second side surfaces 34, 35 is equal to the insert width 14. During cutting, the main cutting edge 11 is moved along a straight path towards the rotational axis A. In FIG. 9, the insert 3 is completely inside the groove 33. During cutting, the second mid-plane 42 of the blade portion 2 moves closer to the rotational axis A.

During cutting, the blade portion 2 is more elongated in a first direction parallel to the tangential cutting force 37 than in a second direction, perpendicular to the tangential cutting force 37 and perpendicular to the rotational axis A.

Figure 10:
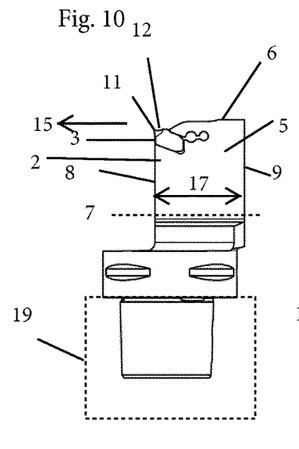
FIG. 10 is a side view of a grooving tool according to a second embodiment.
Figure 11:
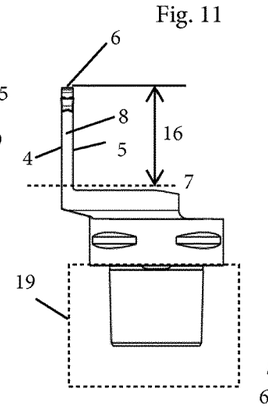
FIG. 11 is a front view of the grooving tool in FIG. 10.
Figure 12:
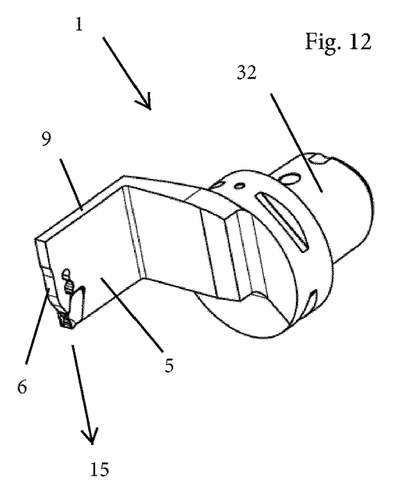
FIG. 12 is a perspective view of the grooving tool in FIG. 10.

Reference is now made to FIGS. 10-12, which show a grooving tool 1 according to a second embodiment. The blade portion 2 is part of the grooving tool 1. In other words, the blade portion 2 is permanently connected to a rear portion of the grooving tool 1, which rear portion comprises a coupling portion 32, which coupling portion 32 conical and is connectable to a machine interface 19. The blade portion rear end 7 is thus not in the form of a rear end surface, but rather in the form of a border separating the blade portion 2 having a blade width 13, and a rear portion have a width greater than the blade width. The blade portion 2 is thus not moveable in a tool block as according to the first embodiment. Thus, according to the second embodiment, the maximum grooving depth is fixed. The distance 16 from the fifth surface 6 to the opposite blade portion end 7 is about 10-50% greater than a distance 17 from the third surface 8 to the fourth surface 9. In all other substantial aspects, the blade portion 2 is similar to or identical to the blade portion according to the first embodiment. The insert 3 is identical to the insert 3 described above. The grooving tool 2 can be used in the method described above.

Figure 13:
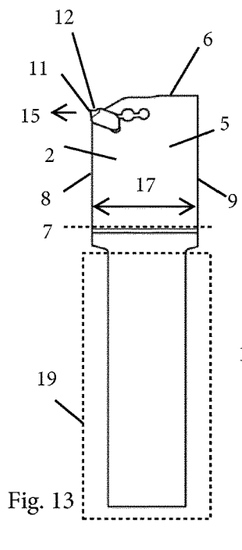
FIG. 13 is a side view of a grooving tool according to a third embodiment.
Figure 14:
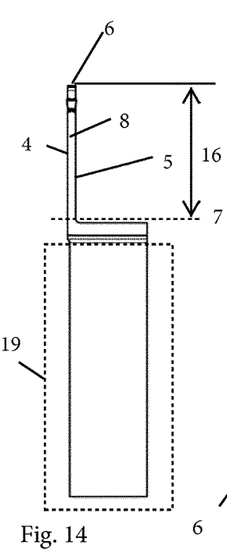
FIG. 14 is a front view of the grooving tool in FIG. 13.
Figure 15:
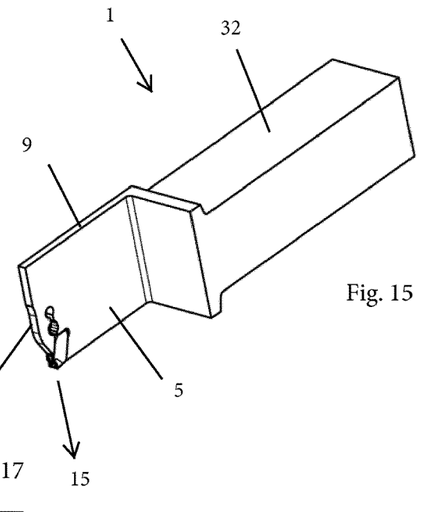
FIG. 15 is a perspective view of the grooving tool in FIG. 13.
Figure 16:
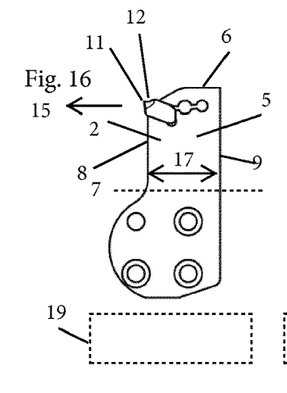
FIG. 16 is a side view of a grooving tool portion according to a fourth embodiment.
Figure 18:
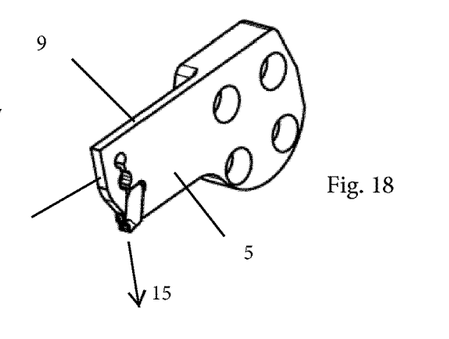
FIG. 18 is a perspective view of the grooving tool portion in FIG. 16.

Reference is now made to FIGS. 13-15, which show a grooving tool 1 according to a third embodiment. The grooving tool 1 according to the third embodiment differ to the grooving tool 1 according to the second embodiment only in that the coupling portion is of shank type or square-shank type. In other words, the coupling portion 32 is square shaped or rectangular shaped in a cross section. The coupling portion 32 may also have other shapes, depending on the configuration of the machine interface 19 to which the coupling portion 32 is connected.

Reference is now made to FIGS. 13-15, which show a grooving tool portion according to a fourth embodiment. The grooving tool portion comprises a blade portion 2 as described in embodiment two and three. The grooving tool portion is connectable to a second or rear or intermediate grooving tool portion (not shown), which is connectable to a machine interface 19.

The machine tool (not shown) is preferably a CNC machine, which can be instructed to perform the described grooving or cutting operation by instructions in a computer program, a computer readable medium or a data stream.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person.

The invention claimed is:

1. A blade portion for a grooving tool for reducing the risk of vibrations during grooving, the blade portion comprising:
   opposite first and second side surfaces, a blade width of the blade portion being a shortest distance between the first and second side surfaces;
   opposite third and fourth surfaces, wherein the third surface forms a top of the blade portion and the fourth surface forms a bottom of the blade portion;
   a fifth surface and an opposite blade portion end, wherein the blade width is constant from the fifth surface up to the blade portion end;

an insert seat separating the third surface and the fifth surface, wherein the insert seat is arranged to receive at least one insert having a main cutting edge, an associated rake face, and an associated main clearance surface, wherein the main cutting edge defines an insert width that is greater than the blade width, the insert being mountable in the insert seat such that the main clearance surface and the third surface are facing in a same direction, wherein the at least one insert includes a top surface and an opposite bottom surface, a front surface and an opposite rear surface, a first side surface and an opposite second side surface, wherein the top surface includes the rake face and the front surface includes the main clearance surface, wherein the blade portion end is a blade portion end surface, the blade portion being a singular body limited by the opposite first and second surfaces, the opposite third and fourth surfaces, and the opposite fifth and blade portion end surfaces; and a shortest distance from the fifth surface to the opposite blade portion end being greater than a shortest distance from the third surface to the fourth surface.

2. The blade portion according to claim 1, wherein a distance from the fifth surface to the opposite blade portion end is 3-8 times greater than a distance from the third surface to the fourth surface, and wherein a distance from the third surface to the fourth surface is 5-20 times greater than the blade width.

3. The blade portion according to claim 1, wherein the opposite first and second surfaces are parallel or substantially parallel.

4. The blade portion according to claim 1, wherein the opposite third and fourth surfaces are parallel or substantially parallel.

5. The blade portion according to claim 1, wherein the insert seat is arranged such that an inherent elasticity of the blade portion is utilized to clamp the insert in the insert seat.

6. The blade portion according to claim 1, wherein the third surface includes a sixth surface and a seventh surface, the fourth surface including an eighth surface and a ninth surface, wherein at least one of the sixth, seventh, eighth or ninth surfaces in a cross section forms an angle greater than 90 degrees in relation to at least one of the opposite first and second surfaces.

7. The blade portion according to claim 1, wherein the third surface includes a sixth surface and a seventh surface, the fourth surface including an eighth surface and a ninth surface, wherein the sixth surface and the seventh surface in a cross section converge towards a first mid-plane located equidistantly between the opposite first and second surfaces, and wherein the eighth surface and the ninth surface in a cross section converge towards the first mid-plane.

8. The blade portion according to claim 1, wherein the insert is mounted in the insert seat such that the main cutting edge is arranged symmetrically in relation to a first mid-plane equidistantly or substantially equidistantly between the opposite first and second surfaces.

9. The blade portion according to claim 8, wherein a second mid-plane of the blade portion is equidistantly or substantially equidistantly between the opposite third and fourth surfaces, and wherein a distance from the second mid-plane to the main cutting edge is greater than a distance from the second mid-plane to the third surface.

10. The blade portion according to claim 8, wherein the insert is mounted in the insert seat such that a portion of the bottom surface and a portion of the rear surface is in contact with the insert seat, a second mid-plane of the blade portion being equidistantly or substantially equidistantly between the opposite third and fourth surfaces, and wherein a plane parallel to the second mid-plane intersects the top and bottom surfaces of the insert.

11. The blade portion according to claim 1, wherein the rake face includes chip breaking or chip control means arranged such that the chip width in grooving can be reduced in relation to the insert width.

12. The blade portion according to claim 1, wherein the rake face includes chip breaking or chip control means being one or more protrusions and/or one or more depressions.

13. A grooving tool comprising:
a blade portion according to claim 1; and
a coupling portion arranged to be connected to a machine interface, wherein the fifth surface is facing in a direction which is opposite in relation to the coupling portion.

14. A grooving tool comprising:
a blade portion according to claim 1; and
exactly one insert.

15. A grooving too comprising:
a blade portion according to, claim 1; and
a tool block, wherein the blade portion is clamped to the tool block, wherein at least a portion of the third surface and at least a portion of the fourth surface is in contact with the tool block, and wherein the tool block includes a coupling portion arranged to be connected to a machine interface.

16. A grooving tool comprising:
a blade portion according to claim 1; and
a tool block, the tool block including a coupling portion arranged to be connected to a machine interface, the blade portion being clampable to the tool block such that a distance between the coupling portion and the blade portion can be chosen over a continuous range.

17. A method for cutting a groove of a predetermined groove width in a work piece, the method comprising the steps of:
providing a work piece comprising metal, the work piece having a peripheral surface;
providing a grooving tool according to claim 11, the grooving tool including the insert;
selecting the insert width to be greater than the blade width;
connecting the grooving tool to a machine interface of a machine tool;
rotating the work piece about a rotational axis thereof in a rotational direction; and
cutting a groove in the work piece by moving the tool in a feed direction towards the rotational axis of the work piece such that the groove width is equal to the insert width and such that a tangential cutting force is directed towards or substantially towards the machine interface.

* * * * *